United States Patent Office 3,339,227
Patented Sept. 5, 1967

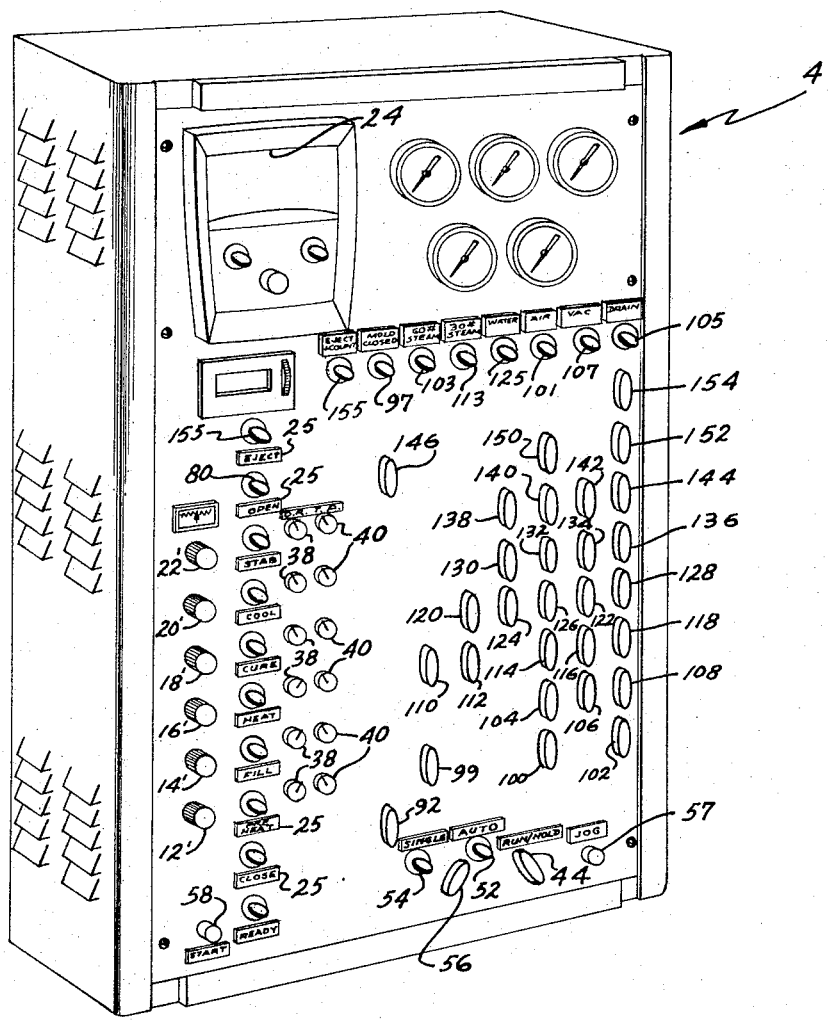

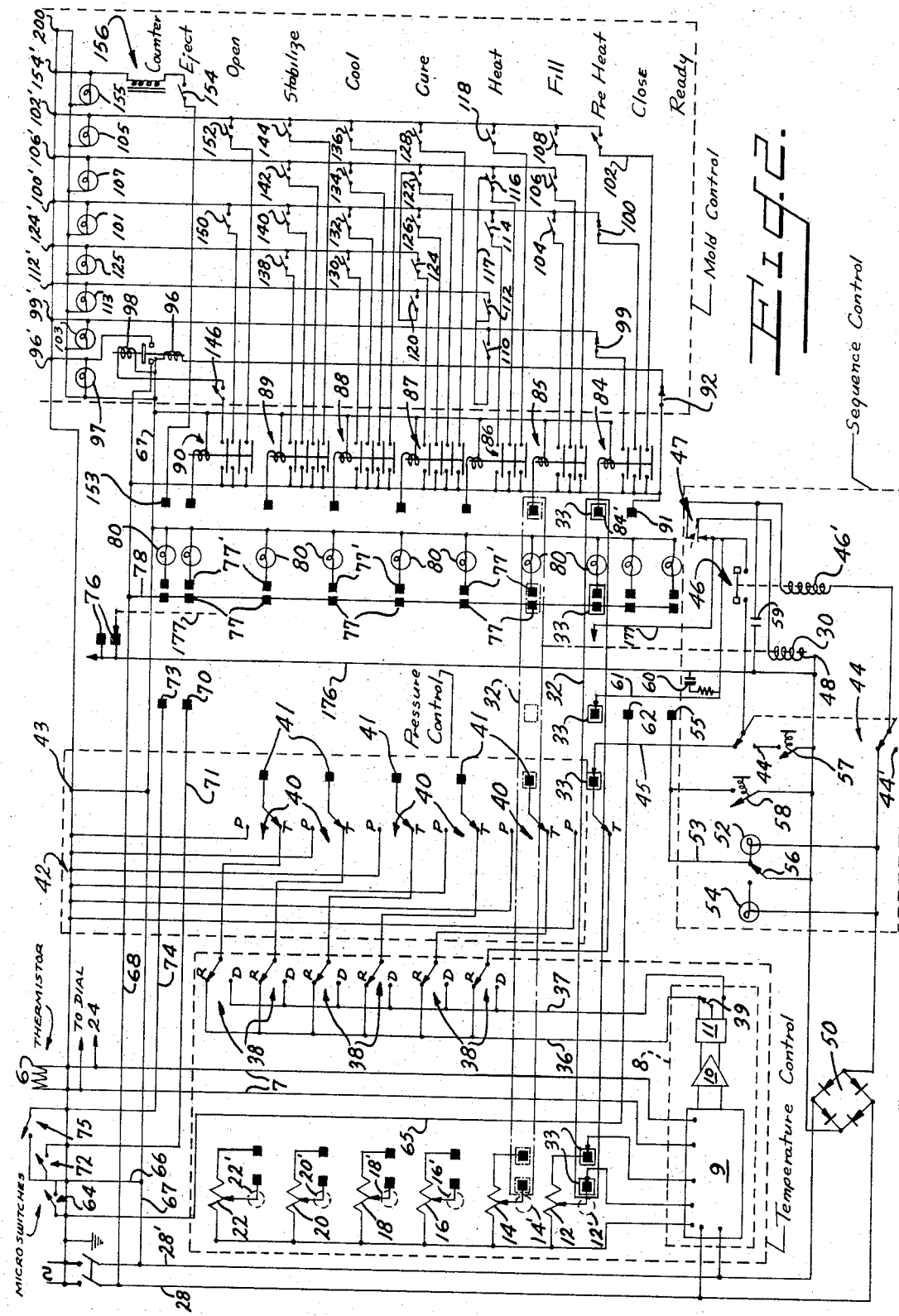

3,339,227
AUTOMATIC CONTROLLER FOR MOLDING
Herbert A. Ehrenfreund, Longmeadow, Mass., assignor to De Bell & Richardson, Inc., Hazardville, Conn., a corporation of Connecticut
Filed Mar. 18, 1965, Ser. No. 440,879
8 Claims. (Cl. 18—2)

ABSTRACT OF THE DISCLOSURE

The controller of this invention includes a temperature responsive resistor and/or pressure sensitive switches located in molding apparatus to sense temperature and/or pressure during various stages of a molding cycle. A resistance comparator including a plurality of reference resistors is also provided for comparing the resistance of the temperature responsive resistor with the resistance of one of said reference resistors, and a step relay actuated by signals from the pressure sensitive switches or the resistance comparator to actuate mold control mechanism for changing from one to the next stage of the mold cycle and to shift to the next reference resistor or pressure sensitive switch for monitoring the next stage of the mold cycle.

---

This invention relates to control equipment for molding processes, and more particularly to a control system for automatically controlling molding of synthetic plastic particles, such as polystyrene beads.

Molding of various materials, including synthetic plastics, is generally carried out as a function of time, i.e., each phase or step of the cycle is continued for a predetermined duration of time before termination and initiation of the succeeding step. While automatic control can be accomplished in this manner, time increments are invariably subject to substantial changes and variations attributable to numerous factors, such as for example temperature variations of the mold heating and cooling means. In molding polystyrene beads, for example, steam and water are used as cooling media and as will be readily appreciated are subject to temperature variations which affect the time duration of the heating and cooling phases.

It is the principal object of this invention to provide a control unit for molding equipment which serves to automatically control operation of the equipment in accordance with pre-selected temperature, pressure or vacuum of an ideal cycle.

It is another object of this invention to provide the mold control apparatus constructed to operate effectively to control multi-phase molding operations with a minimum number of sensing devices.

The above and other objects of this invention will be more readily apparent with the following description and with reference to the accompanying drawings, in which:

FIG. 1 is a perspective view showing a mold control unit of the type embodying this invention; and FIG. 2 is a diagrammatical showing of the automatic control unit embodying this invention.

Referring in detail to the drawings, in FIG. 1 is shown an overall view of a mold control unit 4 embodying this invention. Disposed within this unit is a circuit shown diagrammatically in FIG. 2. For purposes of this application, to facilitate following the description, the unit comprises four sections outlined by broken lines, these are Temperature Control, Pressure Control, Sequence Control and Mold Control Sections.

A sensing device, such as thermistor 6 (FIG. 2) serves to sense temperature conditions within the mold cavity and is connected by means of low resistance leads 7 to an indicator controller 8. The unit 8 comprises a Wheatstone bridge 9, amplifier 10 and relay 11. One such unit suitable for use in producing this invention is the Temperature Indicator Controller, marketed by Fenwal Incorporated, of Ashland, Mass.

In the Temperature Control Section are a plurality of individually adjustable resistors or potentiometers 12, 14, 16, 18, 20 and 22 sequentially interconnectible into one leg of the bridge circuit 9 of the indicator controller 8. Another leg of the bridge circuit 9 is connected to the thermistor 6, the resistance of which varies directly with temperature. The bridge circuit serves as a comparator of the resistances of the thermistor and the particular potentiometer connected to the bridge during any given phase of the mold cycle. Impedance of each of the potentiometers is adjustable to a selected set point value by means of knobs 12' through 22', as shown in FIG. 1. Each phase of the molding cycle, such as heating or cooling, is continued to either raise or lower the temperature and thus the resistance detected by the thermistor whereby a balance of the thermistor resistance and the set-point resistance of appropriate potentiometer is achieved. By using the potentiometer knobs in conjunction with dial 24 (FIG. 1), responsive to the temperature being detected by the thermistor 6, the desired temperature may be set for each phase of the molding operation.

A plurality of vertically spaced labels 25 are disposed on the front panel of the controller, to designate a step in the mold cycle and indicate a corresponding pilot light and a number of selector switches for programming the various phases of a molding operation. Some of the labels 25 correspond to the potentiometers in the Temperature Control Section, for example "Pre-Heat" corresponds to potentiometer 12, "Fill" corresponds to potentiometer 14, potentiometer 16 to the "Heat" phase, potentiometer 18 for "Cure," potentiometer 20 for "Cool," and 22 for "Stabilize."

Change from one resistor to another in the bridge circuit 9, while initiated by the controller 8, is accomplished by the Sequence Control Section which includes a spring-driven, automatic, electric stepping relay, such as a Type 45 marketed by Automatic Electric Company. The relay comprises a coil 30 and a bar or arm 32 movable from one bank of contact terminals to the next in response to energization of the relay coil, the terminals being represented as squares in FIG. 2. The arm includes a series of contacts 33 engageable with the fixed contact terminals. The relay coil is actuated by electrical current when a predetermined condition of temperature or pressure or positional relationship of the molds occurs at any given stage in the mold cycle. Thus the arm 32 is stepped from one to the next bank of contacts energizing in sequence switch circuits in the Mold Control Section of the unit.

The stepping relay coil 30 is energized in the "Ready" position by current from the input circuit and in the mold "Close," "Open" and "Eject" phases of the cycle by microswitches which serve as follow-up for the Mold Control Section. In the other phases of the mold cycle the step relay coil may be energized by the indicator controller 8. The controller 8 is energized by connection to electrical input lines 28 and 28' and its relay 11 is operated when the bridge circuit is nulled or in a balanced condition, that is when the resistance of the thermistor and one of the potentiometers are equal. By operation of relay 11 either lead 36 or lead 37 are energized, these leads are connected to one or the other of a plurality of selector switches 38. As shown, the lead 36 is connected to the upper terminal of the switches 38. This terminal represents a rise "R" in temperature is required in order to obtain the predetermined set point temperature in a given molding step. The lower contact of the switches 38 represents that a drop "D" is required to achieve the particular set point. Selection of "R" or "D" position is normally made prior to commencement of molding operations. Switches 38 enable use of a controller capable of controlling heating and/or cooling operations in response to balance of its bridge circuit. Although during both heating and cooling the bridge 10 is unbalanced, current flow is in different directions whereby relay contact 39 is either engaged with one or the other of the relay output terminals to which leads 36 and 37 are connected. Thus when the bridge circuit is unbalanced during "heating," the lead 37 is energized, but since this is connected to the "Drop" terminal of the switches 38, the circuit to relay coil 30 is open since the corresponding switch 38 would be on "Rise" position. When the bridge is balanced relay 11 is shifted to energize wire 36 and since this is connected to the "Rise" terminal of switch 38, the circuit to coil 30 is completed through a second bank of switches 40. Conversely during cooling before the set point temperature is achieved, wire 36 is energized and when the bridge is balanced relay arm 39 shifts to energize wire 37 which is connected to the "D" terminals of switches 38.

The output from the controller through the row of switches 38 is connected to the switches 40 in the Pressure Control Section of the unit. One terminal of each switch 40 represents temperature and the other pressure, marked "T" and "P" on the front panel of the unit. This series of switches enables either the thermistor 6 or a pressure or vacuum sensitive switch to be used as the basis for controlling a given step of the mold cycle. As shown, the upper terminals of switches 40 are connected to a plurality of terminals 42, for connection to a plurality of pressure or vacuum sensitive switches (not shown), which may be used in any phase of the mold cycle to control operation of the stepping relay in lieu of thermistor 6. Sufficient terminals are provided so that either pressure or temperature can be employed to control the Pre-Heat, Fill, Heat, Cure, Cool or Stabilize phases of the mold cycle. Terminal 43 is provided as a common return connection for all the pressure sensitive switches.

The output terminals 41 of the switches 40 are positioned for sequential contact by the relay arm 32 as it is stepped from one stage to the next. The arm 32 includes means for electrically connecting terminals 41 to a terminal of a "Run-Hold" switch 44; as shown this is lead 45. When switch 44 is in the "Run" position, as shown, the relay coil 30 is connected in circuit with the output terminals 41 of switches 40 by lead 45, relay points 46, interrupter 47, relay coil 30, to junction 48. When the coil 30 is energized in response to a balance of the bridge circuit 9, and the relay arm 32 is stepped to the next row of contacts, interrupter 47 is actuated opening the circuit to coil 30 and closing the circuit to coil 46' causing the points 46 to open. The points 46 and coil 46' comprise a time delay relay and when actuated, the points 46 will remain open for a predetermined time, such as two seconds during which the coil 30 is kept de-energized preventing improper relay actuation caused by transient currents. As will be realized, when the relay arm 32 steps from one level of contacts to the next the bridge circuit is subjected to a drastic change from a balanced to unbalanced condition. This impedance change in the bridge circuit frequently causes false transients which would improperly actuate the step relay whereby it rapidly skips to one or more rows of contacts. The provision of the time delay relay overcomes this difficulty insuring actuation of the stepping relay coil only when the setpoint is achieved at each phase of the molding cycle.

A full wave rectifier, represented at 50 is provided for converting the AC input to the relay to DC. The unit may be operated in either automatic or single cycle operation under control of a selector switch 56. In "Automatic" the molding cycles are continuously and automatically repeated, in "Single Cycle" the unit stops when one cycle has been completed. A pilot lamp 52 is provided and when illuminated indicates the controller is in continuous automatic operation, lead 53 being connected to terminal 55 corresponding to the "Ready" position of the relay arm 32. Lamp 54 indicates that the unit is in single cycle operation, determined by the location of the switch 56.

Switch 44 includes a "Hold" position, represented by terminals 44', in this position coil 30 is only energized when a "Jog" button 57 is pressed. This arrangement may be used at any time to interrupt and correct automatic operation of the unit. Each actutation of the jog button with switch 44 in "Hold" position, will cause the relay to step one level whereby it may be set rapidly to any desired phase of operation.

A start button 58 which is shown as a switch with a spring urging the switch to its normally open position, is provided for commencing a molding cycle when the switch 56 is positioned to "Single Cycle" in which circuit 53 is de-energized. The start button 58 completes circuit 53 thereby energizing coil 30 and causing the arm 32 to be stepped from "Ready" to "Close" position. The step relay circuit includes a capacitor 59 for quenching AC sparks or voltage spikes and resistance-capacitor network 60 for quenching DC sparks.

As previously mentioned, operation of the relay arm 32 from one step to the next is energized by current flow through the coil 30. When the arm 32 is in the "Ready" position it is engaged with contact terminal 55. With the switch 56 is the automatic position (as shown) the relay coil 30 is energized by lead 53 and lead 61. Energization of the relay coil causes the relay arm to be advanced to the next phase which in the embodiment disclosed is designated as the "Close" phase of the operation. In this position, lead 61 carried by the arm 32, is engaged with contact terminal 62; microswitch 64 is connected to the terminal 62 by lead 65. The microswitch 64 is so positioned at the mold, that it is actuated when the mold is closed. Closing of this microswitch energizes relay coil 30 through lead 61. Lead 66 is connected to lead 67 which in turn is connected to supply line 28' and lead 68 is connected to the electrical supply line 28.

Microswitch 64 is actuated when the mold is closed as a result of energization of switch 92 in the Mold Control Section of the unit, to be described below. Closure of microswitch 64 completes a circuit from line 66 through microswitch 64, lead 65, contact 62, and lead 61. In the line above contact 62 is contact terminal 70 connected by lead 71 to a microswitch 72, actuated as the mold is moved to its open position. With the relay arm 32 engaged with contact 70, a circuit is completed through the coil 30 as described above. This causes actuation of the relay whereby the arm 32 steps to the next level of contacts, including terminal 73 which is connected by lead 74 to a microswitch 75, actuated in response to opening of the mold or ejection of a molded part from a mold cavity. The microswitch closes the circuit from line 66 through contact 73, lead 74 and relay coil 30. This causes the relay arm to move to the next line of contacts.

In the embodiment shown, the arm would engage reset contacts as shown at 76. These are representative of a sufficient number of circularly arranged contacts to return the relay to its "Ready" or starting position. The reset contacts are energized by lead 176 and the arm 32 carries lead 177 for electrically connecting the contacts to coil 30 through interrupter 47. The reset contacts are shown disposed in linear arrangement to facilitate obtaining a clear disclosure but it will be realized that relays of this type are usually circular in configuration.

On levels intermediate the contacts 62 and 70 are the six contact terminals 41 each selectively energizable by temperature or pressure sensing elements. Electrical energy from each of these terminals is supplied to coil 30 via lead 45, switch 44, time delay relay points 46, and the interrupter 47. Energization of each contact 41 results when a given temperature or pressure set-point is attained, pressure if the particular switch 40 is in "P" position and temperature if in "T" position.

From the "Ready" position, if the switch 56 is in "Automatic," the step relay will be actuated to repeat the cycle, moving the arm 32 to the "Close" position. If in "Single Cycle," however, the start button 58 may be pressed to initiate another cycle.

The Control Unit includes a bank of pilot lights 80, shown in FIGS. 1 and 2. Each of the pilot lights indicates the phase of the mold cycle which is being carried out at a given time. The pilot lights are sequentially energized as the step relay arm 32 electrically interconnects pairs of contacts 77 and 77'. The pilot light circuit is thus completed from supply line 68 through lead 78, contacts 77 and 77', the light bulb and back to the lead 67.

The Mold Control Section comprises a plurality of transfer relays 84–90 provided for supplying current by way of a plurality of switches to obtain programmed operation of the molding equipment. For example, when relay arm 32 is engaged with the lowermost terminal 91, power is provided to a circuit containing switch 92. This switch would probably be closed in setting up the unit for the usual molding operations. The function of switch 92 is to energize relay coil 96 which when actuated energizes terminal 96' in response to which a solenoid (not shown) causes the mold to be closed. The circuit from contact 96' through the control solenoid is completed to terminal 200 to which ground lead 67 is connected. Relay 96 is a latch type which remains in one position until its oppositely acting relay coil 98 is energized for the mold "Open" sequence. The actuation of the mold closing relay is indicated by pilot light 97.

When arm 32 engages contact terminal 84', transfer relay 84 energizes the circuits controlled by switches 99, 100, 102; these may be opened or closed in any combination of arrangements to achieve desired automatic operation of the pre-heat phase of the mold cycle. Switch 99 is in circuit with terminal 99' for connection to a steam control solenoid. The steam may be under suitable pressure, such as 60 p.s.i. for pre-heating the mold. Pilot light 103 is provided in this circuit to indicate whether steam is being utilized.

Switch 100 is connected to a terminal 100' to which a solenoid for controlling the flow of compressed air may be connected. A pilot light 101 indicates whether or not this solenoid is energized. Switch 102 controls the energization of a terminal 102' for connection to a solenoid for operating a drain on a chamber in which the mold is heated; pilot light 105 indicates whether the drain is open or closed.

When the transfer relay in the Sequence Control Section causes the arm 32 to be stepped to the next level, relay 85 is actuated and switches 104, 106 and 108, if closed, are energized for controlling the operation of the molding equipment. Switch 104 is connected to terminal 100' to which a control solenoid is connected for supplying compressed air such as may be used for blowing plastic beads into the mold cavity.

Switch 106 is connected to terminal 106' and pilot light 107. Terminal 106' in the embodiment shown represents a terminal for connection to a solenoid which operates a valve in a vacuum conduit. If filling of the mold cavities is to be accomplished by vacuum, switch 106 would be closed instead of the switch 104. Drain control switch 108, in circuit with terminal 102', may be opened or closed depending upon the desired condition of the drain during mold filling.

The "Heat" phase is the next step of the mold cycle. There are five switches engageable by relay 86 and numbered 110–118 for controlling molding during this phase. Switch 110 is connected to a terminal 99' and pilot light 103. When switch 110 is closed the pilot light is illuminated and the terminal 99' is energized. This terminal, as previously described, may energize a solenoid for controlling a 60 p.s.i. steam line. Switch 112 is connected to terminal 112' and indicator light 113; this terminal may be connected to another solenoid for controlling another steam supply line, such as 30 p.s.i. steam which is also suitable for use in molding polystyrene beads. One or the other of the steam line control switches would be energized for the heating cycle. Switch 114 is connected to the compressed air control terminal 100' and indicator light 101. During heating, compressed air may be beneficially utilized in conjunction with steam to assist in the penetration of the steam into the cavities of porous molds. Switch 116 is connected to the vacuum control terminal 106', indicator light 107 and to lead 117 connected to switches 112 and 110. As shown, the switch 116 is a double pole switch positioned in its up position; this is a prerequisite to the use of either 30–60 pounds of steam because vacuum should not be used with steam. Thus to energize the steam terminals switch 116 must open the vacuum control circuit. During the heat cycle switch 118 would normally be closed to prevent escape of steam from the pre-heating chamber.

The next level of switches may also be positioned in various combinations to achieve the desired control of the cure phase of the mold cycle. These switches are represented as 120 to 128. Switches 120 and 122 are tied together to prevent vacuum and steam being simultaneously used. Switch 124 is connected to the terminal 124' and the pilot light 125. Terminal 124' is used to energize a solenoid for controlling cooling water supplied during various phases of the molding cycle. Pilot light 125 indicates when the water control solenoid is energized.

Switch 126 is connected to the compressed air control terminal 100' and switch 128 is connected to the drain control terminal 92.

The next step of the mold cycle is cooling of the molds and particularly the molded material. Cooling may be achieved in various ways and four switches designated 130, 132, 134 and 136 are provided for this purpose. Switch 130 is connected to the cooling water control terminal 124 and would normally be closed during this phase. Switch 132 is connected to the compressed air control terminal 100'. For effective cooling, air may be used in conjunction with cooling water. To accomplish this result automatically, switch 132 would be closed during set up of the unit. Pilot light 101 indicates this condition of operation. Switch 134 is connected to vacuum control terminal 106' whereby vacuum may also be used during the cooling phase. Switch 136 is connected to drain control terminal 94. During the cooling phase, the drain would probably be open which means that switch 136 should be closed.

The next phase of the mold cycle is "Stabilize," during which time the molded product is allowed to come to a predetermined stabilization temperature. This phase is controlled by a group of four switches designated 138, 140, 142 and 144. The four switches may be closed and/or opened in various combinations to achieve the desired stabilization effect. Following stabilization, the transfer relay 90 energizes circuits containing switches 146, 150, and 152. Switch 146 would normally be closed energizing coil 98 of the latch relay. This causes the relay to shift from its closed to open position causing the mold to be opened and pilot light 97 to go "off." Switch 150 is connected to the air control terminal 100' and if closed would enable air to be used to cool the mold cavities and the article therein. Switch 152 is also connected to the drain control terminal 102'. When the mold is moved sufficiently open, microswitch 72 is actuated causing the "Open" light to be illuminated and the step relay to be advanced to its "Eject" position.

The final phase of the mold cycle is the "Eject" phase. When step relay arm 32 engages contact terminal 153 a circuit containing switch 154 is energized; this switch is connected to an ejection control terminal 154'. Pilot light 155 located at the top of the vertically disposed row of pilot lights indicates that the unit is in this phase of its operation. With the swich 154 closed, a counting unit represented by coil 156 is energized. An ejected molded part also trips microswitch 75 causing the step relay coil 30 to move the bar 32 to the next step. This would be the resetting phase represented by contacts 76. The bar is continuously advanced by resetting contacts until it returns to the mold closed position at the commencement of another mold cycle.

*Operation summary*

Preliminary to automatic operation of the mold controller, the various switches in the Mold Control Section are positioned to effect in each phase of the mold cycle the desired operations of the mold apparatus. Molding is then carried out and each step is monitored by observing the temperature dial 24 indicative of the temperature sensed by the thermistor. When a desired temperature is indicated on the dial, the appropriate potentiometer knob 12' to 22' is turned until the relay is stepped as indicated by the pilot lights 80. This process is repeated until each of the potentiometers in the temperature control section is set to the desired set point.

After setting up the potentiometers in the manner described, each of the switches 38 and 40 is positioned for desired operation. Switch 56 may be placed in "Auto" position and switch 44 in "Run" position. With the switches so positioned, the relay is automatically and continuously actuated for sequential stepping from one level of contact terminals to the next. It will thus be moved from "Ready" position by a signal, to relay coil 30 from the contact terminal 55.

In the "Close" position, the relay coil 30 receives a signal from microswitch 64 which senses mold closure. The next step is "Pre-Heat," this would generally be controlled by the thermistor 6, the resistance of which is compared with the set point resistance of the potentiometer 12. When these resistances are balanced in the bridge circuit 9, lead 36 is energized and the circuit to the coil 30 is completed through the "R" position of the lower switch 38, the "T" position of the lower switch 40, lead 45, "Run/Hold" switch 44, time delay relay 46, and interrupter 47. The relay will then be stepped to the next level of contacts representing the "Fill" phase of the mold cycle. On actuation of the step relay, interrupter 47 is operated whereby the time delay relay coil 461 is energized, opening the step relay coil circuit for a sufficient period of time to prevent transient voltages from falsely re-actuating the relay. After the predetermined time, the points 46 of the time delay relay close, permitting re-energization of the relay coil 30.

In any of the mold steps from "Pre-Heat" to "Stabilize," the step relay may be energized and actuated by a signal from the controller 8 or from a pressure-sensitive switch connected to the terminals 42 in the Pressure Control Section. This is done, by placing one or more of the selector switches 40 in the "P" position.

At each step of the mold cycle, the various switches in the Mold Control Section control operation of the mold apparatus.

After the various molding steps are completed, the mold is opened by energization of the relay coil 98 in the Mold Control Section. Microswitch 72 is positioned to be operated when the mold is fully opened, energizing coil 30 of the step relay so that the step relay arm is moved to the next position for "Eject" of a molded part. Another microswitch 75 is disposed to be operated by the ejected part whereby the step relay is again actuated to engage successively the resetting contacts 76 by which the step relay is returned to the "Ready" position for another molding cycle.

Having thus described the invention, what is claimed is:

1. Controller for use in automatically operating molding apparatus in a series of steps comprising a temperature responsive resistor disposed to sense molding temperatures, a resistance comparator circuit electrically connected to said temperature responsive resistor, a plurality of reference resistors, the resistance of each being related to a temperature attained in a step of the molding cycle, and means for sequentially interconnecting each of said reference resistors to said comparator circuit in response to completion of a step in the mold cycle.

2. Controller for use in automatically operating molding apparatus in a series of steps comprising a temperature responsive resistor disposed to sense temperature within a cavity of a mold, a plurality of reference resistors, a bridge circuit electrically connected to said temperature responsive resistor, switching means for connecting in sequence, each of said reference resistors to said bridge circuit, each of said reference resistors being adjustable to balance the resistance of the temperature responsive resistor at a plurality of steps in the mold cycle, actuation of said switching means being responsive to electrical balance of said bridge circuit, and control means for instigating operation of steps in the mold cycle, said control means also being actuated by said switching means.

3. Controller for use in automatically operating molding apparatus in a series of steps comprising a thermistor disposed to sense the temperature within a cavity of a mold, a null bridge circuit having one leg electrically connected to include said thermistor, a plurality of variable resistors each being adjustable to a predetermined resistance equal to the resistance of said thermistor when the temperature in the mold is indicative of completion of a step of the mold cycle, a step relay actuated in response to balance of said bridge circuit for sequentially interconnecting each of said variable resistors to said bridge circuit, and a plurality of switch banks for controlling operation of the molding apparatus, said switch banks also being sequentially actuated by said step relay whereby reference resistors and mold control switch banks are automatically, sequentially energized for mold control.

4. Controller for use in automatically operating molding apparatus in a series of steps as set forth in claim 3 and further including a time delay relay actuated in response to actuation of said step relay whereby operation of the step relay is prevented during switching of its contact element from one of said variable resistors to the next.

5. Controller for use in automatically operating molding apparatus in a series of steps comprising a thermistor disposed to sense temperature within a cavity of a mold, a bridge circuit having one leg electrically including said thermistor, a plurality of potentiometers, each adjustable to equal the resistance of said thermistor when the temperature within said cavity is indicative of thermal completion of a given step of the mold cycle, pressure-sensitive switches disposed at said molding apparatus, a plurality of selector switches each connected to receive electrical signals from said bridge circuit and pressure-sensitive switches depending upon the position of said selector switches, a step relay for sequentially interconnecting the output terminals of said selector switches to the step relay coil, said step relay including a contact element movable in response to actuation of the relay, and a plurality of switch banks for controlling operation of molding apparatus, said contact element sequentially energizing said switch banks in selective response to temperature and pressure conditions in the molding apparatus.

6. Controller for use in automatically operating molding apparatus in a series of steps as set forth in claim 5 and further including a plurality of microswitches for sensing movement of the molding apparatus in response to the switch bank circuits, and means for electrically connecting said microswitches to said coil of the step relay.

7. Controller for use in automatically operating molding apparatus in a series of steps comprising in combination a temperature control means including a plurality of potentiometers, a thermistor, a comparator circuit for comparing the resistance of said thermistor and each of said potentiometers, sequence control means for sequentially connecting in circuit with said comparator circuit each of said potentiometers and said thermistor, and mold control means including a plurality of switch control circuits energizable by said sequence control means.

8. Controller for use in automatically operating molding apparatus in a series of steps comprising in combination temperature control section, pressure control section, means for selecting signals from either said temperature or pressure control sections, a step relay actuated in response to the signals selected by said selecting means, and mold control section including a plurality of switch controlled circuits for operating the molding apparatus in steps of a mold cycle, said circuits being sequentially energized by said step relay.

References Cited

UNITED STATES PATENTS

| | | |
|---|---|---|
| 1,916,300 | 4/1933 | Cleveland. |
| 2,156,895 | 5/1939 | Godat _____ 18—2 |
| 2,688,459 | 9/1954 | Merrill et al. |
| 2,726,922 | 12/1955 | Merrill et al. _____ 18—2 |
| 2,760,046 | 8/1956 | Rothacker. |
| 2,829,268 | 4/1958 | Chope. |
| 3,015,129 | 1/1962 | Hays et al. _____ 18—2 X |
| 3,122,783 | 3/1964 | Jolliffe et al. _____ 18—2 |
| 3,224,040 | 12/1965 | Bridges et al. _____ 18—5 |

WILLIAM J. STEPHENSON, *Primary Examiner.*